(12) United States Patent
Babaian et al.

(10) Patent No.: US 6,526,573 B1
(45) Date of Patent: Feb. 25, 2003

(54) CRITICAL PATH OPTIMIZATION-OPTIMIZING BRANCH OPERATION INSERTION

(75) Inventors: Boris A. Babaian, Moscow (RU); Sergey K. Okunev, Moscow (RU); Vladimir Y. Volkonsky, Moscow (RU)

(73) Assignee: Elbrus International Limited, George Town Grand Cayman (KY)

( * ) Notice: Subject to any disclaimer, the term of this patent is extended or adjusted under 35 U.S.C. 154(b) by 0 days.

(21) Appl. No.: 09/505,653

(22) Filed: Feb. 17, 2000

Related U.S. Application Data

(60) Provisional application No. 60/120,460, filed on Feb. 17, 1999.

(51) Int. Cl.[7] .................................................. G06F 9/45
(52) U.S. Cl. ...................................................... 717/161
(58) Field of Search ................................. 717/151–161; 712/233–241

(56) References Cited

U.S. PATENT DOCUMENTS

| | | | | |
|---|---|---|---|---|
| 5,630,157 A | * | 5/1997 | Dwyer, III | 712/23 |
| 5,761,483 A | * | 6/1998 | Trimberger | 717/151 |
| 5,892,936 A | * | 4/1999 | Tran et al. | 712/216 |
| 5,903,760 A | * | 5/1999 | Farber et al. | 717/146 |

* cited by examiner

*Primary Examiner*—Gregory Morse
*Assistant Examiner*—Chuck Kendall
(74) *Attorney, Agent, or Firm*—Townsend and Townsned and Crew LLP

(57) ABSTRACT

A compiler optimization method for optimizing a scheduled block of instructions inserts a conditional branch instruction in place of a merge instruction to select between alternative paths when a condition is resolved.

6 Claims, 5 Drawing Sheets

CRITICAL PATH OPTIMIZATION-OPTIMIZING BRANCH OPERATION INSERTION

CROSS-REFERENCES TO RELATED APPLICATIONS

This application is a continuation of and claims the benefit of U.S. Provisional Application No. 60/120,460, filed Feb. 17, 1999, the disclosure of which is incorporated herein by reference

BACKGROUND OF THE INVENTION

Compiler optimization has its goal transforming code to increase its performance. One important factor in optimization is scheduling operations to increase the speed of predicated operations. The present invention relates to optimizing code executed on an Explicit Parallel Instruction Computing (EPIC) architecture and performs the global task of detecting and refining potential parallelism of the source code being compiled.

The present compiler transforms the source-code program represented as a set of Basic Blocks into Extended Scalar Blocks (ESBs) by applying a compiler technique called if-conversion. Extended Scalar Blocks are regions of the predicated code where all dependencies between operations are represented explicitly as a relation between two operations for a considerable number of operations. For each ESB the compiler works out the critical path which is defined as a sequence of operations that will take the longest CPU time and can't be executed in parallel because of dependencies.

The problem of balancing the amount of control flow and predication at schedule time is solved in IMPACT compiler and is described in the article by David I. August, Wen-mei W. Hwu and Scott A. Mahlke, entitled "A Framework for Balancing Control Flow and Predication," in Proceedings of the 30th annual IEEE/ACM International Symposium on Microarchitecture, pp. 92–103, December 1997.

SUMMARY OF THE INVENTION

According to one aspect of the invention, a compiler optimization method balances the execution time of every set of operations depending on resolution of a condition. Subsequent to removing a condition from the critical path, alternative sets of operations dependent on which value the condition resolves may have different times of termination. A conditional branch selects one of the alternatives when the condition is resolved so that if the alternative with a shorter time of termination is selected it need not wait for the lengthier part of the other alternative to terminate.

According to another aspect of the invention, the difference between the times of termination of the alternative sets of operations is compared to an algorithmic parameter to determine whether to implement the optimization procedure.

According to another aspect of the invention, if either set of operations terminates before the condition is resolved a second successor to the merge is duplicated and moved ahead of the merge to lengthen time of termination of the sets of operations.

According to another aspect of the invention, critical paths are tuned depending on predicates to supply the more exact execution timings instead of common timing of a considered region. Thus, this transformation is a correction of predicated code, obtained after if-conversion, to remove some drawbacks of concurrent execution of if-alternatives (or-parallelism).

Other features and advantages of the invention will be apparent in view of the following detailed description and appended drawings.

DESCRIPTION OF THE SPECIFIC EMBODIMENTS

Figure 1:
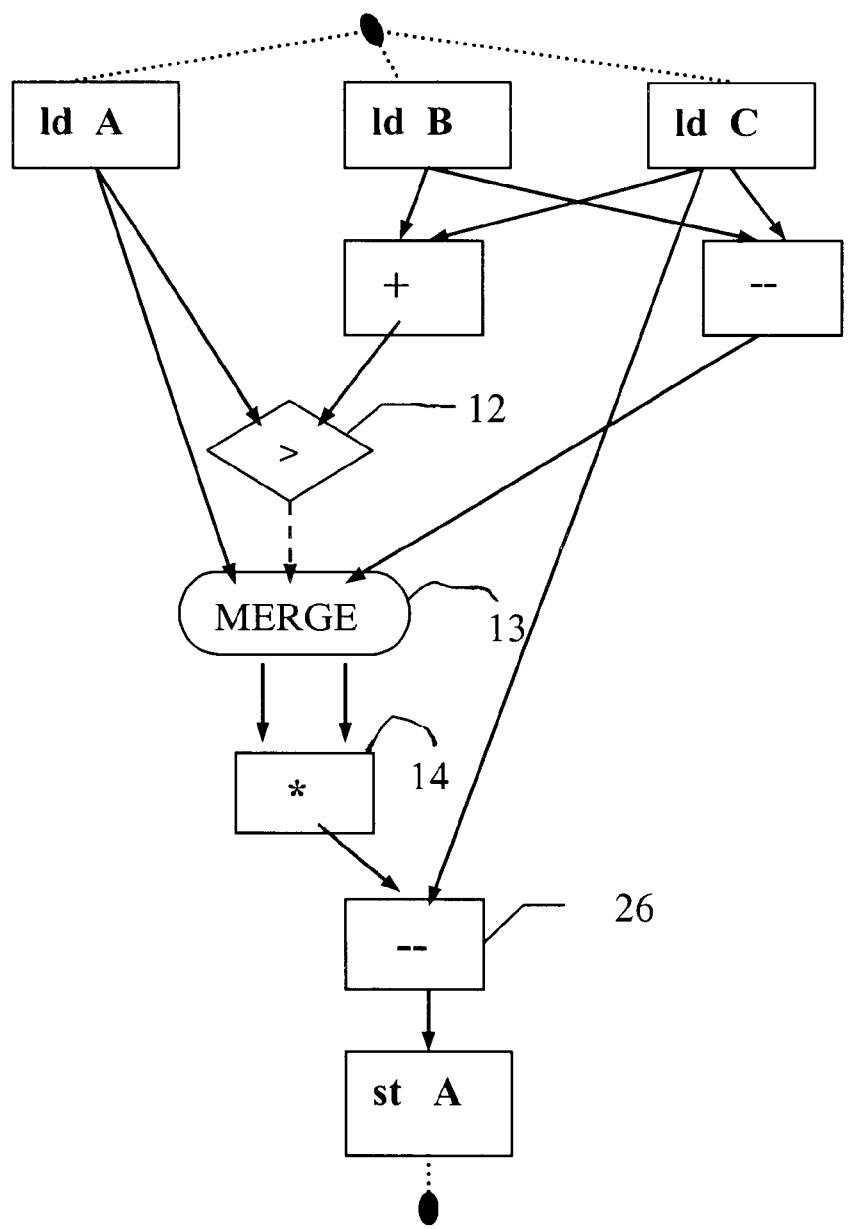
FIG. 1 depicts a scheduled block of instructions having a condition on the critical path.

FIG. 1 depicts an example of compiler scheduling in the situation where the resolution of a condition is on the critical path. In FIG. 1 the critical path (shaded blocks) includes a resolve condition operation 12 and a merge operation 13 which decides between its inputs based on the resolution (Boolean T or F) of the condition 12.

In this optimization method, a merge operation on the critical path is analyzed and transformed. This pseudo merge operation (which may be a real operation in some target architectures with full predication) is added in a predicated intermediate representation to reflect control flow joining by using the operation predicate mode. This merge operation synchronizes outputs of two or more operations, writing to the same register in dependence of a value of corresponding predicate, with inputs of consumers of this register value in the point of merging control flow. Including such a merge operation in program representation makes it possible to reflect in data flow form the points of merging control flow of the program, and to implement optimizations via data flow and predicate dependencies concurrently.

Figure 2:
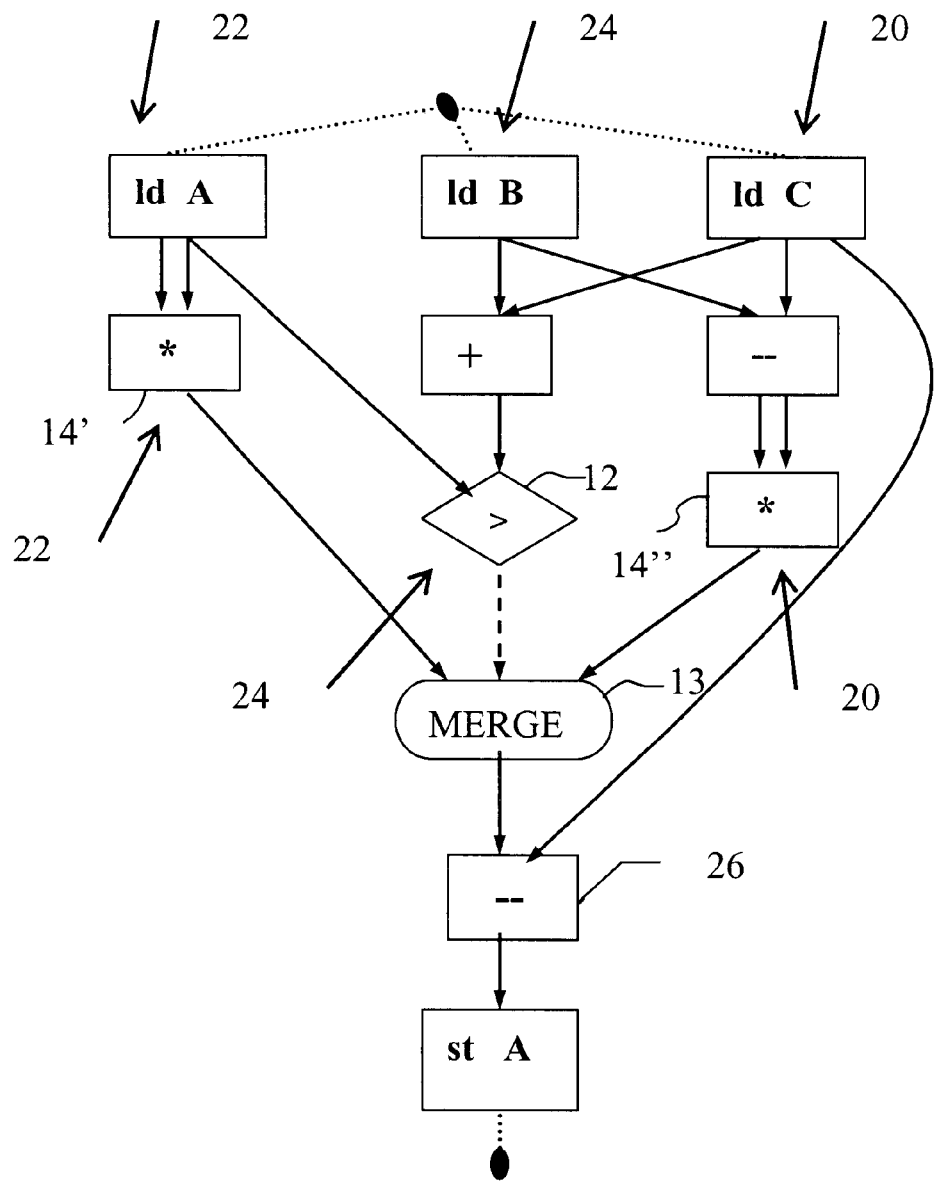
FIG. 2 depicts a scheduled block of instructions where the condition is on the critical path for one alliterative set of scheduled instructions.

MERGE cond1, x1<t>, x2<f>-->respseudo-operation of merging data flow by condition cond1, with output –res=x1, if cond1=true and –res=x2, if cond1=false In FIG. 2 the (*) operation 14, the successor to the merge of FIG. 1, has been "unzipped" to form duplicates 14' and 14" and the right set of operations 20 is more lengthy, i.e., because it has mole operations and thus takes longer to complete, than the left set of operations 22. Thus, if the right set of operations 20 is taken then the condition is resolved before the set of operations completes and the condition has been removed from the critical path. However, because the left set of operations 22 is shorter than the center set of operations 24, the condition will not be resolved before the left set of operations 22 completes so that the condition remains on the critical path for this alternative.

Figure 3:
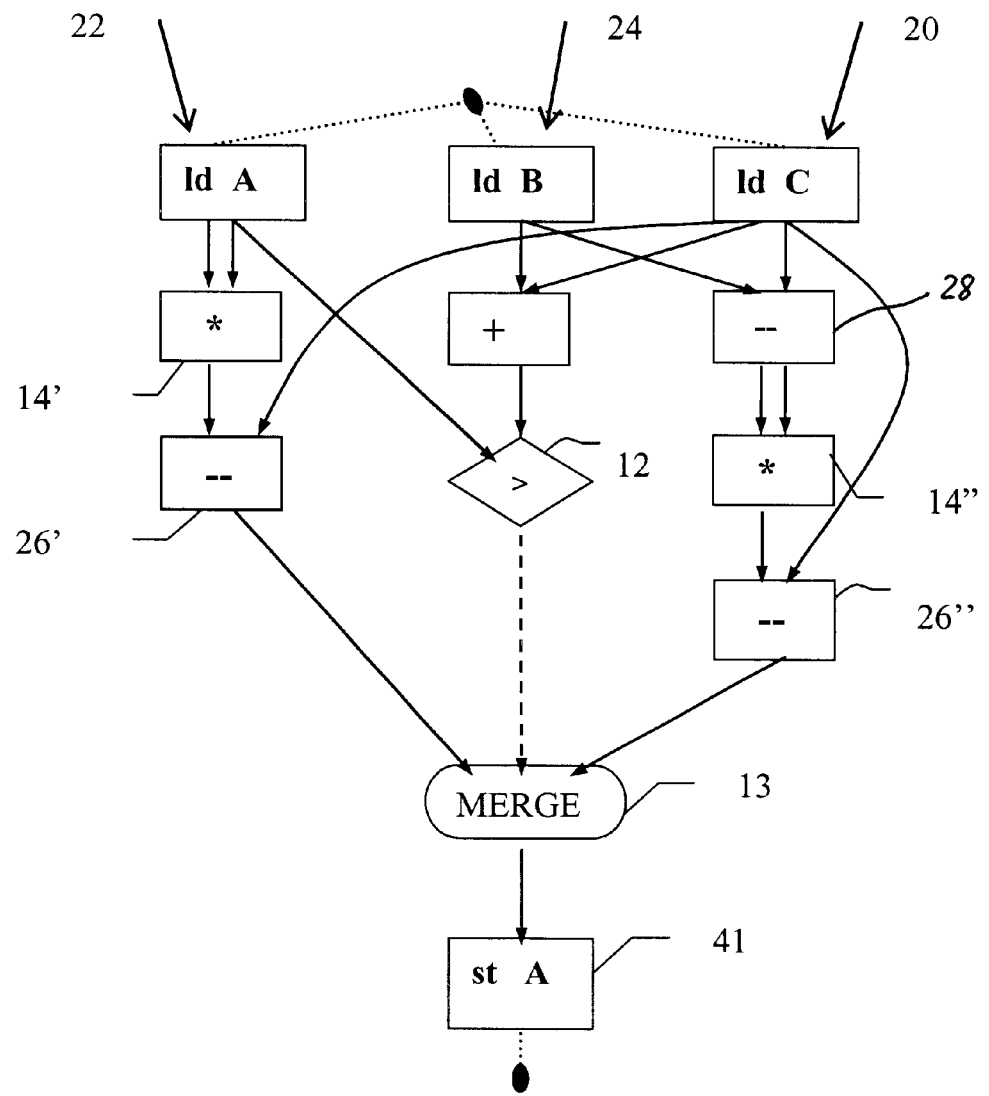
FIG. 3 depicts a scheduled block of instructions where the condition is resolved before either alternative set of scheduled instructions completes.

In FIG. 3 the right and left sets of operations 20 and 22 are balanced by "unzipping" the (–) operation 26, which is the successor to the merge in FIG. 2, to form duplicates 26' and 26". In this case, the condition is resolved before either the right or left sets of operations 20 or 22 complete and thus the condition is removed from the critical path. However, the merge cannot be scheduled until result operands are available from the both the right and left sets of operations 20 and 22. In this case, the right set of operations 20 has two (−)operations 26" and 28 and takes longer to complete than the left set of operations 22. If the merge selects the right set of operations 20 when the condition resolves false (mask false) and the left set of operations 22 when the condition resolves true (mask true) then for mask true the merge could have been executed earlier. However, since the compiler doesn't know ahead of time how the condition will resolve the compiler must schedule the merge based on the worst case scenario, i.e., the lengthier time of completion of the right set of operations 20.

Figure 4:
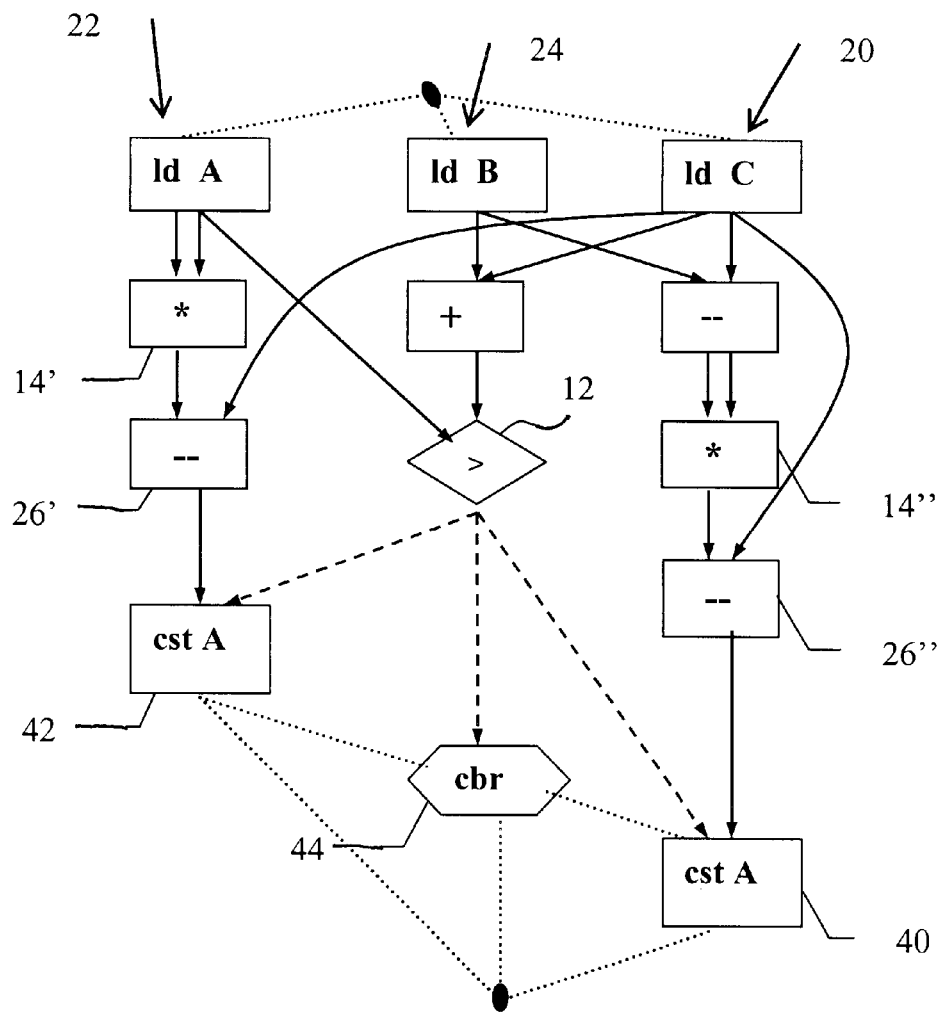
FIG. 4 depicts a scheduled block of instruction where each alternative set of instructions is on the critical path and the time of completion of each alternative is independent of the time of completion of the other alternative.

FIG. 4 shows a preferred embodiment of a solution to the problem. The merge is replaced by a conditional branch operation 44 inserted in the center set of operations 24 and the store operation 41 is replaced by right and left conditional stores 40 and 42 in the right and left sets of operations 20 and 22, respectively. For mask true the conditional branch 44 passes control immediately to the left conditional store 42 of the left set of operations 22 so that the store is executed immediately without waiting for the right set of operations 20 to complete. Thus, the part of the right set of operations 20 which takes longer to complete than the left set of operations 22 is bypassed so that the next block of operations can be scheduled efficiently. For mask false all the steps of the right set of operations 20 are completed and the block following the load is scheduled. The result of inserting the conditional branch is that the shorter completion time of the left set of operations 22 is scheduled independently of the extra length of time required to complete the right set of operations 20.

The following is the resultant code of the scheduling block depicted in FIG. 4, where cond,t selects the left set of operations 22 and cond,f selects the right set of operations 20:

```
...
i7         ::    sub r1,r2->res1; ...
...
i9         ::    sub r3,r4->res2;
i9         ::    cst<cond,t>A<-res1;
i9         ::    cbr<cond,t>->ent0;------
i10        ::    nop
i11        ::    cst<cond,f>A<-res2;
ent0:<-----------------------------------
i12        ::    NEXT BLOCK
```

Note that the sub r3, r4->res2; cst<cond,t>A<-res1; and cbr<cond,t>->ent0 operations are all executed at the same time in i9 because the EPIC architecture is capable of executing plural instructions in a single clock. If the condition resolves true then control is passed to ent0 which immediately leads to i12, and the next block is executed without waiting for operations scheduled for i10 and i11, needed to complete the right set of operations 20, so that, in this example, two cycles are saved.

Generally, to balance a critical path depending on some predicate, P, the operations in a given scheduled block are analyzed to estimate the earliest and latest operation starting times. This analysis determines sets of operations, S<P, t>which is a set of operations depending on the resolution of P as true (true mask), in this case the left set of operations 22, a set of operations, S<P,f>which is a set of operations depending the resolution of P as false (false mask), in this case the right set of operations 20, and a set of operations, S0, in this case the center set of operations 24, that do not depend on the resolution of P.

If a common critical path goes through either the sets of operations S<P,t>, or S<P,f>, and does not go through the set of operation S0 then two earliest times of termination are defined; T(S<P,t>) and T(S<P,t>) for the sets of operations S<P,t>and S<P,t>respectively.

Note that, in FIG. 2, T(S0) is greater than T(S<P,t>) because the left set of operations 22 completes before the condition is resolved. Thus, to balance the right and left sets of operations 20 and 22 the (−) operation 26 following the merge 13 was unzipped to lengthen the right set of operations so that T(S<P,t>) is greater than T(SO) so that the condition is resolved before either right or left set of operations completes.

As described above, the goal of the current optimization is to bypass the extra cycles required to execute the longer set of operations when the shorter set of operations is selected by the condition mask. However, the optimization technique requires extra instructions and steps, notably the scheduling of a conditional branch, and therefore is not performed unless the difference in the completion times exceeds an optimization criterion: that is abs[T(S<P,t>)−T(S<P,f>)] is greater than an architecture-dependent parameter. This parameter depends on the target architecture and is determined by factors such as the time cost of a branch operation and dependence on conditions.

Figure 5:
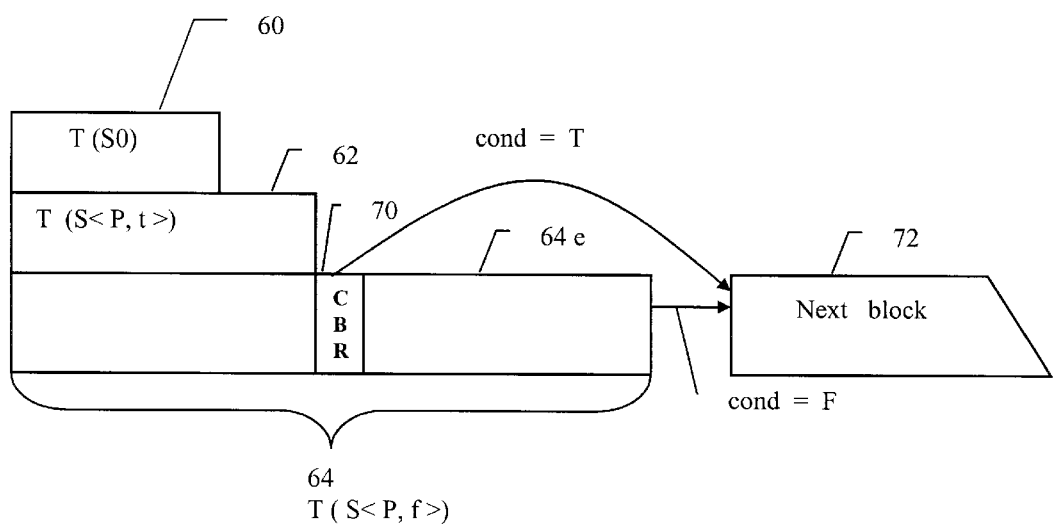
FIG. 5 is a timing diagram depicting the completion times of each set of operations of FIG. 4.

If the criterion is satisfied then the goal of the conditional branch insertion is to support the execution time of S<P,t> if P is true and S<P,f> if P is false. These times are depicted in FIG. 5. The top block 60 is T(S0), the middle block 62 is T(S<P,t>), and lowest block 64 is T(S<P,f>). In the lowest block 64, the part of the block 64e representing the part of T(S<P,f>) that exceeds T(S<P,t>), is hatched. It is the goal of branch insertion to avoid waiting on this hatched part 64e of T(S<P,f>) when S<P,t> is executed.

In the case where T(S<P,f>) is sufficiently greater than T(S<P,t>) the following are the steps for determining where to locate the conditional branch: 1) all operations in S0 and S<P,t> should be scheduled to execute before the conditional branch; 2) those operations in S<P,f> which would execute after T(S<P,t>) should be scheduled to execute after the branch. In a compiler that schedules based on control and data flow dependencies this scheduling can be achieved by setting control flow dependencies.

Thus, as depicted in FIG. 5, the conditional branch operation 70 is scheduled so that S0 and S<P,t> are predecessors of the conditional branch operation 70 and operations 64e in S<P,f> scheduled to execute after T(S<P,t>) are successors to the branch instruction. As depicted in FIG. 5, if the condition resolves true the conditional branch 70 changes control flow to the beginning of the next block 72 so the operations 64e in S<P,f> scheduled to execute after T(S<P,t>) are skipped over and the time of execution of the current block in the case of mask true is T(S<P,t>).

In a preferred embodiment the optimization technique is performed by a digital computer that executes program code stored on a computer readable medium.

The invention has now been defined with reference to the preferred embodiments. Alternatives and substitutions will now be apparent to persons of skill in the art. In particular, although the embodiment described shows dependencies between branch and conditional store operations, such dependencies need not be limited between branch and stores but may also be between branches and other operations. Further, the invention is not limited to EPIC architectures but can be utilized to optimize scheduling for other architectures that allow parallel execution of instructions. Accordingly, it is not intended to limit the invention except as provided by the appended claims.

What is claimed is:

1. A compiler optimization method for optimizing a scheduled block of instructions having a condition resolution instruction included on a critical path, said method comprising the acts of:

identifying a scheduled critical path including a condition resolving operation, a merge operation where selection of inputs from two predecessor operations is predicated by the resolution of the condition, and a first successor operation receiving a result selected by the merge operation when the condition is resolved;

scheduling unzipped duplicate first successor operations of the first successor operation prior to the merge operation so that said unzipped duplicate first successor operations can be executed while the condition is being resolved, with each unzipped duplicate first successor operation receiving a result from a respective one of said predecessor operations;

determining a first time of termination of a first set of operations, including a first unzipped duplicate first successor operation, which outputs a first result selected by said merge operation when said condition resolves to a first value;

determining a second time of termination of a second set of operations, including a second unzipped duplicate first successor operation, which outputs a second result selected by said merge operation when said condition resolves to a second value; and inserting a conditional branch operation in place of said merge operation to control selection of said first or second outputs to transfer to a subsequent scheduled block so that selection is performed when said condition is resolved.

2. The method of claim 1 where the scheduled block terminates with a store instruction and further comprising the acts of:

removing the store instruction from the scheduled block;

adding a first conditional load instruction to said first set of operations to conditionally store said first result; and adding a second conditional load instruction to said second set of operations to conditionally store said second result;

with said conditional branch operation selecting either said first or second conditional load operation depending on the resolution of said condition.

3. The method of claim 1 further comprising the acts of:

comparing the difference between said first and second times of termination to an architecture dependent parameter to decide whether to implement an optimization procedure.

4. The method of claim 1 further comprising the act of:

subsequent to scheduling said unzipped duplicates of said first successor operation, determining a third time of termination of a set of operations ending with the condition resolving operation followed;

if said third time of termination is less than either said first or second times of termination and said condition resolving operation is followed by a second successor operation;

scheduling unzipped duplicate first successor operations of the second successor operation prior to the merge operation so that said unzipped duplicate second successor operations can be executed while the condition is being resolved to lengthen the first and second sets of operations so that the condition is resolved before either the first or second set of operations terminates.

5. A compiler optimization method for optimizing a scheduled block of instructions having a condition resolution instruction and a merge instruction, which selects from inputs depending on a value of a resolved condition, included on a critical path, said method comprising the acts of:

determining a first time of termination of a first set of operations, including a first unzipped duplicate operation, which outputs a first result selected a merge operation when a condition resolves to a first value;

determining a second time of termination of a second set of operations, including a second unzipped duplicate operation, which outputs a second result selected by said merge operation when said condition resolves to a second value;

inserting a conditional branch operation in place of said merge operation to control selection of said first or second outputs to transfer to a subsequent scheduled block.

6. A computer progeria product comprising:

a computer readable storage structure embodying computer program code thereon, with said computer program code comprising:

computer program code for causing a computer to identify a scheduled critical path including a condition resolving operation, a merge operation where selection of inputs from two predecessor operations is predicated by the resolution of the condition, and a successor operation receiving a result selected by the merge operation when the condition is resolved;

computer program code for causing a computer to schedule unzipped duplicates of the successor operation prior to the merge operation so that said unzipped duplicate operations can be executed while the condition is being resolved, with each unzipped duplicate operation receiving a result from a respective one of said predecessor operations;

computer program code for causing a computer to determine a first time of termination of a first set of operations, including a first unzipped duplicate operation, which outputs a first result selected by said merge operation when said condition resolves to a first value;

computer program code for causing a computer to determine a second time of termination of a second set of operations, including a second unzipped duplicate operation, which outputs a second result selected by said merge operation when said condition resolves to a second value; and computer program code for causing a computer to insert a conditional branch operation in place of said merge operation to control selection of said first or second outputs to transfer to a subsequent scheduled block so that selection is performed when said condition is resolved.

* * * * *